Sept. 27, 1955   H. T. M. RICE ET AL   2,718,879
FLUID POWER APPARATUS
Filed Jan. 8, 1952   2 Sheets-Sheet 1
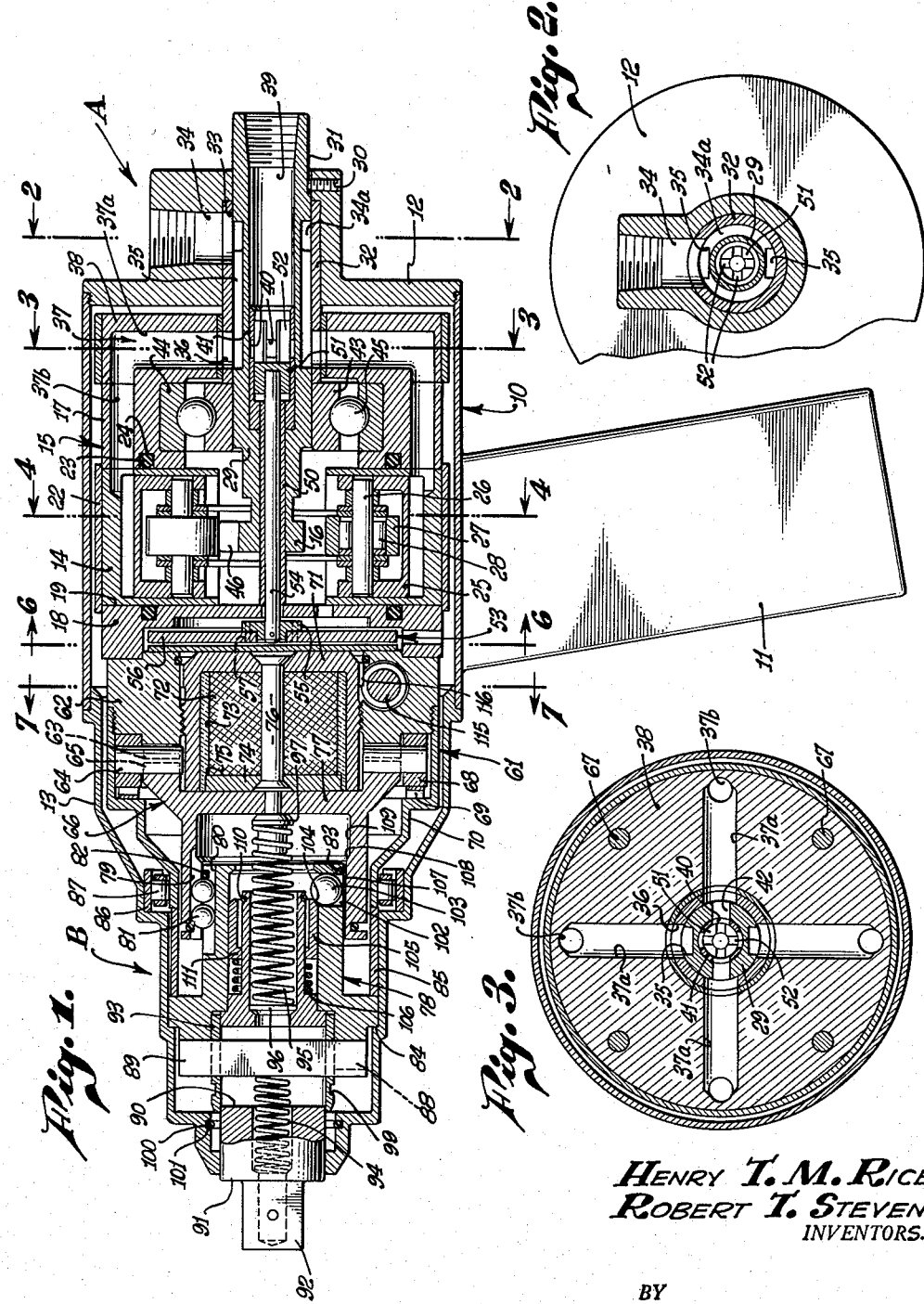
HENRY T. M. RICE,
ROBERT T. STEVENS,
INVENTORS.
BY
Bernard Kriegel
ATTORNEY.

Sept. 27, 1955 H. T. M. RICE ET AL 2,718,879
FLUID POWER APPARATUS
Filed Jan. 8, 1952 2 Sheets-Sheet 2
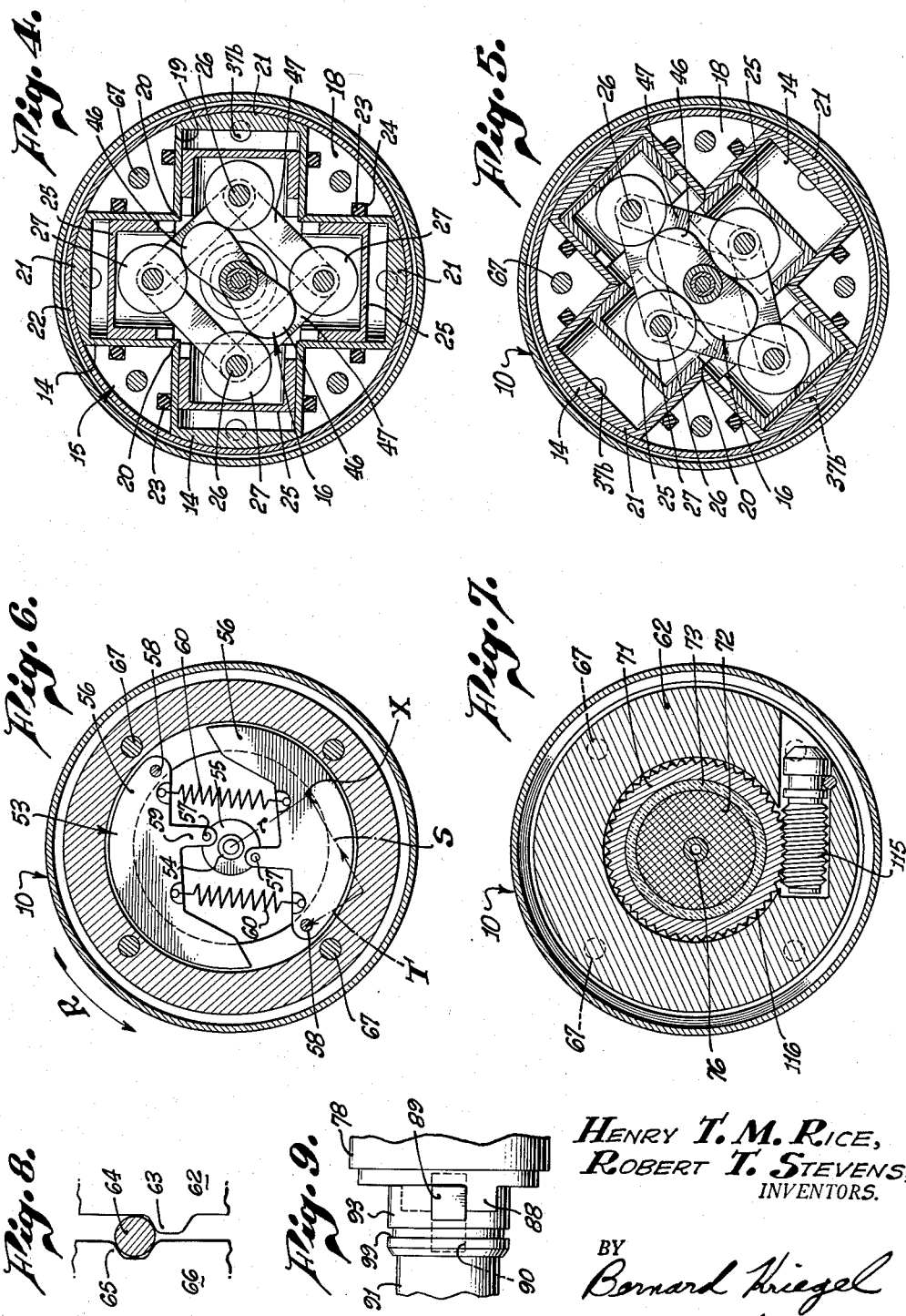
Henry T. M. Rice,
Robert T. Stevens,
INVENTORS.
BY Bernard Kriegel
ATTORNEY.

United States Patent Office 2,718,879
Patented Sept. 27, 1955

2,718,879
FLUID POWER APPARATUS

Henry T. M. Rice, San Marino, and Robert T. Stevens, Altadena, Calif., assignors to Dillon Stevens, Los Angeles, Calif.

Application January 8, 1952, Serial No. 265,512

11 Claims. (Cl. 121—59)

The present invention relates to fluid power devices, and more particularly to fluid operated prime mover mechanisms.

An object of the present invention is to provide a fluid power device embodying radially arranged cylinders and pistons which are relatively reciprocated by a cam or eccentric, and in which improved means maintain the pistons in appropriate relation with respect to each other and to the cam or eccentric. In a more limited sense, both the cylinders and pistons contained therein are caused to revolve about the axes of the cam or eccentric. Another object of the invention is to provide a fluid operated motor embodying radially arranged cylinders and pistons in which the speed of the motor is maintained substantially constant by an improved valve mechanism.

A further object of the invention is to provide a fluid operated motor whose speed is controlled by a speed responsive governor operative to maintain the motor speed substantially constant despite sudden imposition of relatively heavy loads on the motor.

Still another object of the invention is to provide a fluid power device that is relatively economical to manufacture, and which can be easily assembled.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through an apparatus embodying the invention, with parts being shown in elevation;

Fig. 2 is a cross-section taken along the line 2—2 on Fig. 1;

Fig. 3 is a cross-section taken along the line 3—3 on Fig. 1;

Fig. 4 is a cross-section taken along the line 4—4 on Fig. 1, with the pistons and cylinders occupying one relative position;

Fig. 5 is a view similar to Fig. 4, disclosing the pistons and cylinders occupying another relative position;

Fig. 6 is a cross-section taken along the line 6—6 on Fig. 1;

Fig. 7 is a cross-section taken along the line 7—7 on Fig. 1;

Fig. 8 is a diagrammatic, fragmentary side elevation of a portion of the primary clutch;

Fig. 9 is a side elevation of the secondary clutch portion of the apparatus.

The device A embodying the invention is illustrated in the drawings in combination with a releasable torque transmitting mechanism B, which is particularly designed for rotating threaded fastening elements (not shown), such as nuts, bolts, studs and screws, to a predetermined degree of tightness. It is to be understood, however, that the invention has other uses in that it is of more general application than the specific use illustrated and described above.

As illustrated in the drawings, a fluid operated motor is contained within a housing or casing 10 that may be manually held, as by suitably grasping a handle 11 extending laterally from the housing. The rear end of the housing 10 has an end closure 12 threaded thereinto; whereas, the forward end of the housing is suitably secured to a housing or case 13 for the releasable torque transmitting portion B of the apparatus.

Disposed within the motor housing 10 are radially arranged cylinders 14, which, as specifically illustrated, are carried in a rotor or head 15 that is rotatable about the axis of the housing 10 and of a stationary cam 16. The head includes two parts 17, 18 which abut one another in the central transverse plane of the cylinders 14. The two parts have radial semi-cylindrical bores 19 therein which collectively provide pockets or recesses for receiving the radial cylinders 14, all of which preferably lie in the same transverse plane perpendicular to the axis of the cam 16. The inner ends 20 of the cylinders mutually abut, while their outer head ends 21 are curved, to coincide with the periphery of the rotatable head 15. The cylinders 14 are maintained in proper assembled relation in the head 15, with their inner ends 20 in abutment with one another by an encompassing retaining band or sleeve 22 which engages the outer peripheries of the cylinders 14 and also the outer peripheries of the two head portions 17, 18 on opposite sides of the cylinders. It is apparent that the band 22 prevents outward movement of the cylinders 14 from the head, while maintaining the head portions in alignment. Fluid leakage between the exterior of each cylinder 14 and the head 15 is prevented by a suitable side seal 23, such as a rubber, or rubber-like, O ring, encompassing the cylinder and contained within a suitable ring groove 24 formed in the two head sections 17, 18.

A piston 25 is reciprocable in each of the cylinders 14, being capable of moving radially inward or outward of the cylinder. Each piston has a wrist pin 26 extending thereacross, on which a follower roller 27 is rotatably mounted through the agency of anti-friction roller bearing elements 28, which are rollable upon the wrist pin 26 and also upon the inner surface of the follower roller 27. The latter member is engageable with the periphery of the eccentric member or cam 16, which, in the device illustrated in the drawings, is held stationary. Thus, the cam has a sleeve extension 29 extending rearwardly from the plane of the cylinders 14 out through the end closure 12, to which the extension may be secured in any suitable manner, as by means of a set screw 30 threaded transversely in the extension 12 and bearing upon a flat portion 31 of the cam sleeve extension.

The extension 29 is appropriately supported in the end closure 12, having a rather long bearing surface in contact with the end closure itself, or with a sleeve 32 surrounding the extension 29 and carried within the closure 12. This sleeve is designed to determine the passage of air, or corresponding fluid medium, from the cylinders. Thus, the sleeve 32 is provided with an exhaust side port 33 communicating with an outlet 34 extending transversely through the end closure 12. This exhaust port 33 communicates with an exhaust groove 34a in the cam extension member 29, which, in turn, communicates with a pair of diametrically opposite exhaust passages 35 formed in the extension, each of which leads to an exhaust port 36 in the sleeve 32 forwardly of the rear end closure 32. These diametrically opposite ports 36 are arranged to communicate with fluid passages 37 in another section 38 of the head or rotor 15 leading through the section 17 to the head end of each cylinder 14. There is one of these passages 37 for each of the cylinders, the passage including a transverse branch 37a extending through the section 38 of the rotatable head or rotor, which communicates with a longitudinally extending portion 37b running through the intermediate head portion 17 and leading into the head end of the cylinder.

The cam extension 29 also has a central inlet passage 39 for air, or other fluid, which communicates with lateral ports 40 in a bearing sleeve 41 in alignment with diametrically opposite inlet ports 42 extending through the cam extension 29 and sleeve 32 surrounding the latter (see Fig. 3, particularly). These inlet ports 42 are disposed 90 degrees out of phase with the exhaust ports 36 extending through the sleeve 32. Thus, a pair of diametrically opposite transverse passages 37 through the rotor 15 will be in alignment with the inlet ports 42, while another pair of transverse passages are in alignment with the exhaust ports 36. Accordingly, air under pressure can enter one pair of diametrically opposite cylinders 14 to urge their pistons 25 inwardly while the diametrically opposite pistons of the other pair of cylinders are moving outwardly to exhaust the air to the atmosphere.

The rotor 15 is rotatably supported by the cam extension 29 through the aid of a ball bearing, which consists of an inner race 43 mounted on the cam extension, and an outer race 44 clamped between the intermediate head portion 17 and the end head portion 38. A set of balls 45, or corresponding rolling elements, are rollable in both races.

As disclosed in the drawings, the follower rollers 27 on the pistons 25 engage the periphery of the radial cam 16, which has two diametrically opposite and radially extending lobes 46. The cam is so designed that one pair of diametrically opposite pistons 25 is being moved radially outward while another pair is moving radially inward, the follower rollers 27 being at all times maintained in engagement with the periphery of the cam. To insure such engagement, the pistons are preferably interconnected by links 47. Thus, a pair of links is pivotally mounted on a wrist pin 26 of one piston on opposite sides of its follower roller 27, and this pair of links has its two other ends pivotally mounted on a wrist pin of a piston disposed 90 degrees away. Another pair of links 47 is pivotally mounted on a wrist pin 26 of the first-mentioned piston on opposite sides of its follower roller 27, and this pair of links extends in the opposite direction from the first pair, and is pivotally mounted on the wrist pin 26 of a piston which is diametrically opposite the second-mentioned piston. These second and third pistons are, in turn, connected to the fourth piston by means of links 47 in the same manner that the first piston is connected to the second and third pistons.

It is apparent that as a pair of diametrically opposite pistons 25 is moving inwardly, with their follower rollers 27 in engagement with the cam 16, that the links 47 cause the other pair of pistons 25 to move radially outward. Similarly, when the second pair of pistons is moving inwardly, the links cause the first pair to move outwardly. In addition, assurance is had that the pistons 25 of each diametrically opposite pair are moving toward each other, or away from each other, at the same time, and that they are always disposed the same distance from the axis of the cam 16.

In the operation of the air motor, compressed air enters the air inlet 39 of the cam extension 29 and will pass through the inlet ports 42 into one pair of diametrically opposite rotor passages 37, the air passing into the head end of one pair of diametrically opposite cylinders 14. This air will force the pistons 25 radially inward and, because of the slope of the faces of the stationary cam 16, the pistons 25 will be caused to be moved angularly, or to rotate, about the axis of the cam, carrying the cylinders 14 and head 15 around with them, as well as the other pair of cylinders and pistons, the follower rollers 27 of which are caused to ride up the cam faces to force their pistons radially outward, exhausting the air in their cylinders through the other pair of passages 37 and through the exhaust ports and passages 36, 35, 34a, 33, 34 to the atmosphere.

As was just stated, the inward action of one pair of pistons 25 causes all of the pistons and cylinders 14, and the head 15, to rotate about the axis of the cam 16, until the pair of air actuated pistons are in their innermost position, as determined by engagement of their follower rollers 27 with the low points of the cam 16, at which time the follower rollers 27 of the other pair of pistons are at the high points of the cam (Fig. 5). At this time, the head 15 has rotated to a position in which the passages 37 for the first pair of cylinders are now in communication with the exhaust ports 36, whereas the passages for the other pair of cylinders have been rotated into communication with the inlet ports 42. Air under pressure will now enter the last-mentioned passages, moving the diametically opposite pistons 25 inwardly and in a downward direction along the cam faces, the other pair of pistons being caused to move radially outward in their cylinders 14 by riding up the cam surfaces, the air from these cylinders passing out through the exhaust ports 36 to the atmosphere.

The above described mode of operation occurs alternately with the diametrically opposite pairs of cylinders and pistons, each cylinder being first exposed to air under pressure from the inlet 39 and then, when its piston is at the innermost portion of its stroke, being placed in communication with the exhaust port 36. In this manner, air under pressure is being applied to a pair of diametrically opposite cylinders at all times, to insure the continued rotation of the cylinders 14, pistons 25 and their supporting head or rotor 15.

The speed of the motor is maintained constant by a speed controlled valve device which determines the amount of air that can pass through the inlet ports 42. This valve includes the sleeve 41 described above, which is secured to a sleeve extension 50 running through the stationary can 16 and suitably secured to the head 15, to rotate therewith. The sleeve 41 has four ports 40, one in alignment with each of the rotor passages 37a, whereas there are only two diametrically opposite ports 42 extending through the cam extension 29 and outer sleeve 32.

An inner sleeve 51 is disposed within the intermediate sleeve 41, and this inner sleeve is provided with four slots 52. The inner sleeve 51 is rotatable with the intermediate sleeve 41, but is angularly movable with respect thereto, so as to be disposed varying amounts across the intermediate sleeve ports 40, and thereby determine the pressure of the air that can enter these ports 40 and the rotor passages 37 leading to the cylinders 14. The sleeve valve 51 is angularly movable within the intermediate sleeve 41 between positions in which the ports 40 of the latter are fully open and fully closed.

The inner sleeve 51 is angularly movable within the intermediate sleeve 41 by a speed responsive governor 53. Thus, the inner sleeve 51 is secured to a rod 54 extending freely through the intermediate sleeve extension 50. The forward end of this rod is attached to a disc 55, to which diametrically opposite governor weights 56 are connected by means of pins 57. Each weight is pivoted on the forward head portion 18 by a fulcrum pin 58, and has a transversely extending arm 59 connected to the disc 55 by means of the aforementioned pin 57. The weights 56 are oppositely directed and tend to move outwardly under the influence of centrifugal force, in order to angularly move the disc 55 in a direction urging the inner valve 51 to closed position across the intermediate sleeve ports 40. Such outward swinging of the weights 56 about their fulcrum pins 56 is resisted by helical tension springs 60, one end of each of which is attached to a weight 56 at a point remote from its fulcrum pin 58, and the other end of which is secured to the opposite weight at any suitable point, such as a point adjacent its fulcrum pin. It is apparent that upon deceleration of the rotor or head 15, the springs 60 and inertia force of the weights 56 will urge the weights 56 inwardly to rotate the disc 55, valve rod 54 and inner valve sleeve 51 in a direction opening the intermediate sleeve ports 40 to allow a greater quantity of air under greater pressure to enter the rotor passages 37.

The forward head portion 18 abuts the end of the rotatable housing 61 of the automatic releasable torque transmitting mechanism. This housing includes a driving clutch member 62 having cam type of clutch teeth 63 on its forward face engageable with rollers 64, which, in turn, engage cam type of clutch teeth 65 on a driven clutch member 66. The driving clutch member 62 is caused to rotate with the rotor 15 by securing them together. As specifically disclosed, the sections 18, 17, 38 of the rotor and the driving clutch member 62 are attached together by circumferentially spaced longitudinally extending studs 67 projecting through all of the rotor sections and threaded into the driving clutch member 62.

The transversely extending clutch rollers 64 are rotatably mounted in a ring or cage 68, which is urged in a rearward direction against the driving clutch member 62 by a spring device 69, which may assume the form of a spring washer of wave-shape bearing upon the cage 68 and the foward rotatable housing portion 70, which is threaded onto the driving clutch member 62. The spring washer 69 can yield, to allow the cage 68 to move axially forwardly when the primary clutch 62, 63, 64, 65, 66 is to be released.

The primary clutch elements are maintained in driving engagement with one another by magnetic means. Thus, a cup-shaped magnet holder 71 is threaded in the driving clutch member 62 and carries a permanent magnet 72 therein. A suitable non-magnetic shield 73, such as a brass bushing, is interposed between the magnet 72 and the side wall of the holder 71. A plate 74 extends across the forward face of the permanent magnet 72, engaging a shoulder 75 in the bushing to hold the latter in place. The cup-shaped holder 71, bushing 73, magnet 72, and plate or pole piece 74 are secured together by a central rivet 76.

The primary driven clutch member 66 has a transversely extending wall or armature portion 77 which contacts the pole piece 74 to be attracted by the magnet to hold the driven clutch teeth 65 in engagement with the rollers 64, and the latter in engagement with the driving clutch teeth 63. Since the clutch teeth are formed as cams, torque being transmitted therebetween provides an axial force component tending to shift the driven clutch member 66 in an axial engagement out of driving relation with respect to the rollers 64, to disconnect the primary clutch. When the torque transmitted exceeds the axial force or pull of the magnet 72, the driven member 66 is shifted axially in a forward direction and the primary clutch is disengaged.

The driven clutch member 66 is connected to the driving member 78 of a secondary clutch through a spline connection. This spline connection includes opposed longitudinal grooves 79, 80 in the driven member and the driving member of the secondary clutch, with one or more balls 81 disposed in the grooves and serving as rollable keys to connect the driven member 66 and driving member 78 together, while permitting the driven member 66 to move axially with respect to the driving member 78. The balls 81 are retained in position within the grooves 79, 80 by split snap rings 82 disposed in peripheral grooves 83 in the driven member and also in the driving member of the secondary clutch.

The driving member 78 of the secondary clutch engages a shoulder 84 in the torque release casing 13, and is held against this shoulder by a spacer sleeve 85, which engages the forward end of the rotatable primary clutch housing 70. This housing is rotatably mounted in the torque release case 13 by a suitable bearing, which is disclosed in the form of roller bearing elements 86 engaging the periphery of the housing 70 and also the inner surface of a race 87 confined within the outer case 13.

The secondary driving member 78 has axially extending driving clutch teeth 88 engageable with a transverse square pin 89 extending through a transverse slot 90 provided in a spindle 91 projecting outwardly of the case and provided with a square, or other suitably shaped, end 92, on which a suitable socket wrench or screw driver head (not shown) may be mounted, for application to a threaded fastening element (not shown). The pin 89 projects in opposite directions through a guide and latch sleeve 93 which is slidable on the spindle 91, this guide and latch sleeve 93 and the driven clutch pin 89 normally being urged in a rearward direction, to hold the pin 89 in engagement with the secondary clutch driving teeth 88, by a helical spring 94 disposed in the spindle and bearing upon the pin 89. When the spindle 91 is urged rearwardly of the mechanism, the rearwardly directed force is transmitted through the spring 94 to the pin 89, urging the latter towards engagement with the primary clutch teeth 88.

The spindle 91 is urged in the opposite direction, to disconnect the pin 89 from the secondary clutch teeth 88, by a disengaging spring 95 disposed within the spindle and bearing upon a suitable spring seat 96 in the latter and also against a rearward spring seat 97 bearing upon the armature 77 of the primary clutch device. This spring 95 urges the spindle 91 in a forward direction, causing the rearward end 98 of the spindle slot to engage the pin 89 and carry it, together with the guide sleeve 93, in a forward direction until the pin is out of engagement with the secondary clutch driving teeth 88. When this occurs, a groove 99 in the guide sleeve 93 is disposed opposite a detent 100, in the form of a contractible split ring disposed in a groove 101 in the case 13, this detent snapping into the sleeve groove 99 and holding the sleeve 93, together with the clutch pin 89 passing therethrough, in a clutch releasing position.

When the driven member 66 of the primary clutch is urged in a forward direction, upon a predetermined torque being transmitted therethrough, which is sufficient to overcome the holding force of the magnet 72, it is held in this clutch released position by a latch device. Thus, the driving member 78 of the secondary clutch has transverse holes 102 therein in which ball detents 103 are mounted. These balls are urged in an outward direction by the upper cam or tapered portion 104 of a latch sleeve 105 surrounding the spindle 91, the latch sleeve being urged in a rearward direction by a helical spring 106 bearing upon the spindle and the latch sleeve 105. When the primary clutch 62—66 is engaged, the ball detents 103 engage the inner cylindrical surface 107 of the primary driven member 66, and cannot be shifted in an outward direction by the latch sleeve 105. However, upon forward movement of the driven member 66, as a result of the torque being transmitted therethrough, a tapered shoulder 108 on the driven member is disposed opposite the latch balls 103, which then allows the sleeve 105 to be shifted rearwardly by its actuating spring 106, forcing the balls 103 laterally outward of the secondary driving member 78 and upon the shoulder 108. At the same time, the cylindrical periphery 109 of the sleeve 105 is disposed opposite the balls, preventing the latter from being shifted inwardly by the tapered shoulder 108 on the driven member. In this manner, the balls 103 hold the primary driven member 66 in its clutch disengaged position, until the ball detents 103 are purposely released.

So long as endwise rearward pressure is being exerted on the spindle 91, the driven member 66 of the primary clutch is held in its released position. Upon removing the endwise pressure on the spindle 91, the spring 95 shifts the spindle forwardly to a position in which the guide sleeve 93 and pin 89 are held in the forward position by the detent 100 entering the sleeve groove 99, holding the pin 89 out of engagement with the teeth 88 of the secondary clutch driving member 78. During such forward motion of the spindle 91 under the influence of the spring 95, a snap ring 110, or other outward projection, on the spindle engages a shoulder 111 on the latch sleeve 105, to carry the latter in a forward direction to a position in which its cylindrical periphery 109 is disposed out of alignment with the latch balls 103. When this occurs, the spring 95 within the spindle 91 can shift the armature 77 of the primary driven clutch member 66 in a rearward direction, the tapered driven member shoulder 108 forcing the balls 103 inwardly to their retracted position and the primary clutch elements 65, 64, 63 reengaging. However, any rotation that is now imparted to the driven clutch member 66 and through the spline connection 79, 80, 81 to the secondary driving member 75 cannot be transmitted to the spindle 91, since the secondary clutch 88, 89 is latched in disengaged position. Endwise pressure in a rearward direction imposed upon the spindle 91 will force the sleeve 93 out of the detent 100, and will allow the spring 94 to shift the pin 89 and sleeve 93 rearwardly to a position in which the pin is again engaged with the driving teeth 88 of the secondary clutch.

In the device illustrated, it is preferred to rotate the cylinders 14, pistons 25 and head 15 so as to provide a comparatively large flywheel effect, furnishing enough inertia for rotating the spindle 91 and the threaded fastener to which it is connected, in order to tighten the latter to the predetermined torque. Such predetermined torque tightness can be varied by suitably adjusting the magnet 72 in the driving clutch member 62, as by rotating a worm 115 carried in the driving clutch member 62 and engaging a worm wheel 116 formed on the cup-shaped holder 71, thereby appropriately threading the magnet 72 within the driving member.

In the event the threaded fastening element encounters substantial resistance prior to its being tightened to its predetermined torque, the governor acts in a rapid manner to admit more air to the cylinders 14, thereby maintaining the speed of the fluid motor substantially constant. Thus, the governor responds very quickly to deceleration forces, causing a very rapid full opening of the valve 51 whenever necessary. By referring to Fig. 6, it will be noted that the center of gravity of each governor weight 56 may be considered as being at the point "X." The rotor 15 and the governor are being rotated in the direction of the arrow R. Due to the rotation in such direction, each weight is tending to continue rotating in the direction of the arrow S, passing through its center of gravity X, or normal to a radius r drawn from the axis of rotation to the center of gravity. The force of the weight tending to continue moving in the direction of the arrow S makes a moment arm T with the fulcrum pin 58 on which the weight is mounted. Accordingly, if the spindle 91 encounters substantial resistance tending to greatly decelerate the prime mover, the weights 56 tend to continue moving in the direction of the arrow S, and, because of the moment arm T of the forces, tend to shift inwardly about their fulcrums 58 very quickly and to a comparatively great extent, this force supplementing the force of the springs 60, and rapidly shifting the disc 55, rod 54 and inner valve member 51 with respect to the intermediate valve sleeve 41 to fully open the ports 40 in the latter and providing the necessary greatly increased air at a greater pressure in the cylinders 14, which will almost immediately bring the motor back to its intended operating speed. Of course, as the speed increases, the weights 56 again move outwardly about their fulcrum pins 58, to partially close the valve 51, and thereby prevent increase in the motor speed substantially beyond the governor setting.

Certain features of invention disclosed herein, relating to the releasable torque transmitting device and its combination with the prime mover mechanism, are both described and claimed in our co-pending application for "Releasable Torque Transmitting Apparatus," Serial No. 265,511, filed January 8, 1952.

Features of invention relating to the manner of adjusting the torque at which the apparatus will release are both described and claimed in our co-pending application for "Adjustable Releasable Torque Transmitting Apparatus," Serial No. 265,513, filed January 8, 1952.

The inventors claim:

1. In fluid power apparatus: stationary cam means; a rotor rotatable about said cam means; radial cylinders in said rotor; pistons reciprocable in said cylinders and engaging said cam means; said rotor having passages therein communicating with said cylinders; means providing an outlet port communicable successively with said passages; means providing a radial inlet port communicable successively with said passages; means coaxial of said rotor for feeding fluid to said inlet port; each of said passages alternately communicating with an inlet port and an outlet port during rotation of said rotor; and a sleeve valve disposed in said feeding means coaxially of said rotor and movable across said radial inlet port to control the passage of fluid into said passages and cylinders.

2. In fluid power apparatus: stationary cam means; a rotor rotatable about said cam means; radial cylinders in said rotor; pistons reciprocable in said cylinders and engaging said cam means; said rotor having passages therein communicating with said cylinders; means providing an outlet port communicable successively with said passages; means providing a radial inlet port communicable successively with said passages; each of said passages alternately communicating with an inlet port and an outlet port during rotation of said rotor; a sleeve valve coaxial of said rotor movable arcuately across said radial inlet port to control the passage of fluid into said radial passages and cylinders; and means responsive to the speed of said rotor for shifting said sleeve valve angularly with respect to said inlet port.

3. Fluid power apparatus as defined in claim 2, wherein said speed responsive means includes a weight pivoted eccentrically on said rotor about an axis generally parallel to the rotor axis, a straight line through the center of gravity of the weight and normal to a radial line through said center of gravity passing laterally outward to one side of the pivotal axis of the weight, and means connecting said weight to said sleeve valve to shift the latter.

4. In fluid power apparatus: stationary cam means; a rotor rotatable about said cam means; radial cylinders in said rotor; pistons reciprocable in said cylinders and engaging said cam means; said rotor having passages therein communicating with said cylinders; said cam means having an outlet port communicable successively with said passages; said cam means having an inlet port communicable successively with said passages; each of said passages alternately communicating with an inlet port and an outlet port during rotation of said rotor; a sleeve coaxial of and rotatable with said rotor and disposed within said cam means, said sleeve having side ports in substantial alignment with said passages and communicable with said inlet port; and a sleeve valve in said sleeve coaxial of said rotor and arcuately movable with respect to said sleeve for determining flow of fluid into said side ports and inlet port.

5. In fluid power apparatus: stationary cam means; a rotor rotatable about said cam means; radial cylinders in said rotor; pistons reciprocable in said cylinders and engaging said cam means; said rotor having passages therein communicating with said cylinders; said cam means having an outlet port communicable successively with said passages; said cam means having an inlet port communicable successively with said passages; each of said passages alternately communicating with an inlet port and an outlet port during rotation of said rotor; a sleeve coaxial of and rotatable with said rotor and disposed within said cam means, said sleeve having side ports in substantial alignment with said passages and communicable with said inlet port; a sleeve valve in said sleeve coaxial of said rotor and arcuately movable with respect to said sleeve for determining flow of fluid into said side ports and inlet port; and means responsive to the speed of said rotor for shifting said sleeve valve arcuately within said sleeve and with respect to its side ports.

6. Fluid power apparatus as defined in claim 5, wherein said speed responsive means includes a weight pivoted eccentrically on said rotor about an axis generally parallel to the rotor axis, a straight line through the center of gravity of the weight and normal to a radial line through said center of gravity passing laterally outward to one side of the pivotal axis of the weight, and means connecting said weight to said sleeve valve to shift said sleeve valve angularly with respect to said sleeve.

7. In fluid power apparatus: stationary cam means; a rotor rotatable about said cam means; radial cylinders in said rotor; pistons reciprocable in said cylinders and engaging said cam means; said rotor having passages therein communicating with said cylinders; means providing an outlet port communicable successively with said passages; means coaxial of said rotor providing a radial inlet port communicable successively with said passages; each of said passages alternately communicating with an inlet port and an outlet port during rotation of said rotor; a sleeve within said means which provides the inlet port, said sleeve having radial side ports in substantial alignment with said passages and communicable with said radial inlet port; and a sleeve valve movable arcuately in said sleeve for determining flow of fluid into said radial side ports and inlet port.

8. In fluid power apparatus: a stationary housing; a cam within said housing; a tubular extension secured to said cam and housing; a rotor rotatably mounted on said extension; radial cylinders in said rotor; pistons reciprocable in said cylinders and engaging said cam; said rotor having passages communicating with said cylinders; an outer stationary sleeve on said extension having inlet and exhaust ports communicable with said passages, said extension having an exhaust passage communicating with said exhaust port; an inner sleeve in said extension having side ports in substantial alignment with said rotor passages and communicable with said inlet port; means securing said inner sleeve for rotation with said rotor; said extension providing a fluid inlet passage to said side ports.

9. In a fluid power apparatus: a stationary housing; a cam within said housing; a tubular extension secured to said cam and housing; a rotor rotatably mounted on said extension; radial cylinders in said rotor; pistons reciprocable in said cylinders and engaging said cam; said rotor having passages communicating with said cylinders; an outer stationary sleeve on said extension having inlet and exhaust ports communicable with said passages, said extension having an exhaust passage communicating with said exhaust port; an inner sleeve in said extension having side ports in substantial alignment with said rotor passages and communicable with said inlet port; means securing said inner sleeve for rotation with said rotor; said extension providing a fluid inlet passage to said side ports coaxial of said rotor; and a valve in said inner sleeve coaxial to determine flow of fluid from said inlet passage to said side ports.

10. In fluid power apparatus: cam means; a head composed of a plurality of separate sections having opposed cavities; radial cylinders in said cavities; means securing said sections together around said cylinders; pistons reciprocable in said cylinders and engaging said cam means; and an annular sealing member circumscribing each cylinder and in sealing engagement therewith, said sealing member being disposed in a groove in said sections.

11. In fluid power apparatus: cam means: a head composed of a plurality of separate sections having opposed cavities; radial cylinders separate from said sections and disposed in said cavities; means securing said sections together around said cylinders; pistons reciprocable in said cylinders and engaging said cam means; and a band circumscribing said cylinders and sections to prevent radial outward movement of said cylinders.

References Cited in the file of this patent

UNITED STATES PATENTS

| | | |
|---|---|---|
| 696,663 | Barker | Apr. 1, 1902 |
| 716,492 | Sterne | Dec. 23, 1902 |
| 788,390 | Bardenwerper | Apr. 25, 1905 |
| 959,172 | Seguin | May 24, 1910 |
| 1,272,791 | Freer | July 16, 1918 |
| 1,759,641 | Cook | May 20, 1930 |
| 2,080,973 | Speth | May 18, 1937 |
| 2,217,669 | Cantoni | Oct. 15, 1940 |
| 2,246,648 | Van Sittert et al. | June 24, 1941 |
| 2,284,763 | Olson | June 2, 1942 |
| 2,375,490 | Overly | May 8, 1945 |